June 18, 1940.   V. H. GRIER   2,204,547
BLOOD TEST TUBE
Filed Nov. 3, 1939
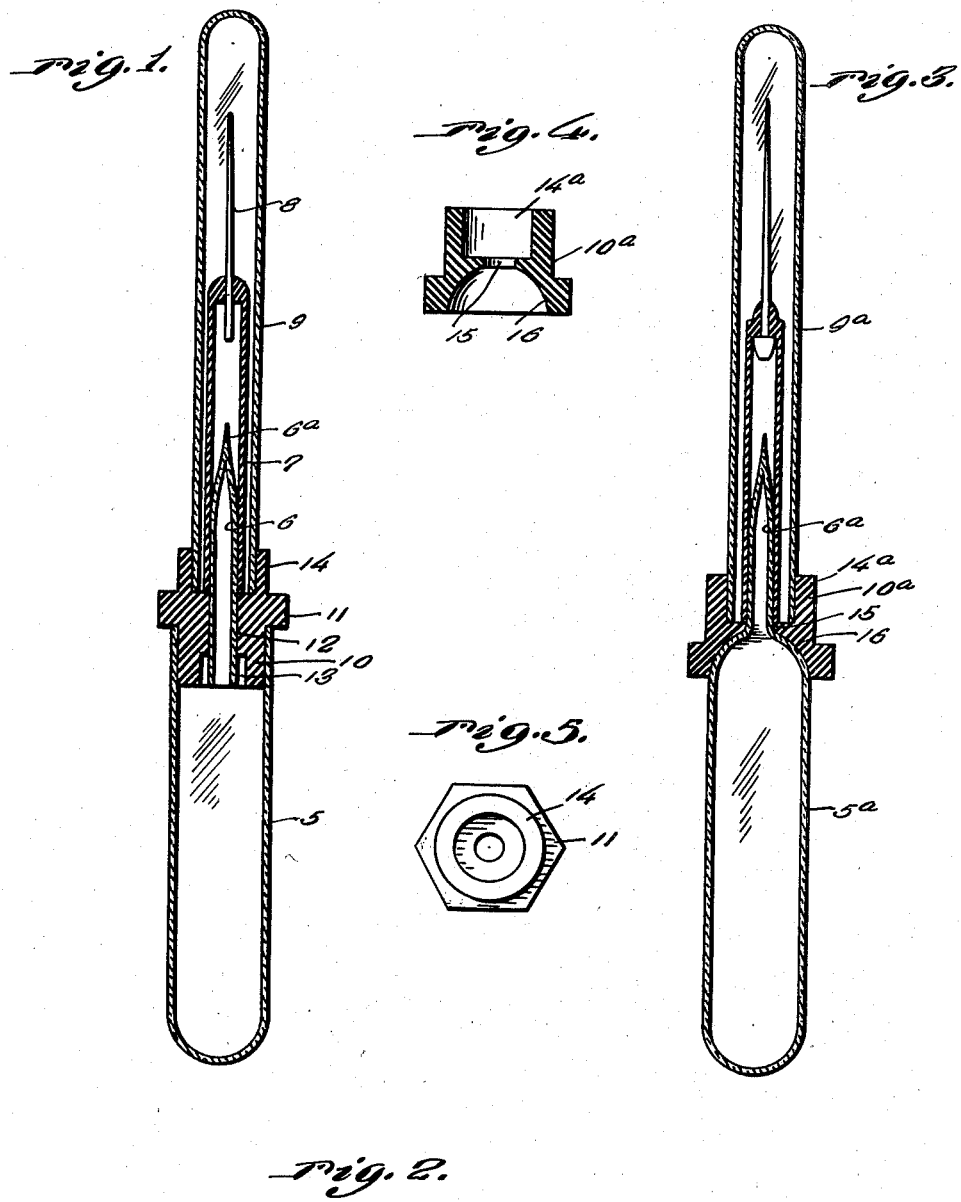
Inventor
Virginia H. Grier
By Clarence A. O'Brien
and Hyman Berman
Attorneys Patented June 18, 1940

2,204,547

UNITED STATES PATENT OFFICE 2,204,547

BLOOD TEST TUBE

Virginia H. Grier, Pleasantville, N. J.

Application November 3, 1939, Serial No. 302,763

3 Claims. (Cl. 128—272)

This invention relates broadly to tubes or apparatus used in testing blood, that is to say for obtaining a sample of blood for analytical purposes; and the invention has particular reference to improved means for connecting or sealing the joint between the vial or tube and the cover member.

The invention together with its objects and advantages will be best understood from a study of the following description taken in connection with the accompanying drawing wherein:

Figure 1 is a longitudinal sectional view through a vial and associated parts illustrating the application of the invention.

Figure 2 is a sectional view through a stopper forming part of the assembly shown in Figure 1.

Figure 3 is a view similar to Figure 1 but illustrating the application of the invention to the vacuum Keidel tube type of blood testing apparatus.

Figure 4 is a sectional view through a stopper forming part of the assembly shown in Figure 3, and Figure 5 is a top plan view of either the stopper shown in Figure 2 or the stopper shown in Figure 4.

Referring more in detail to the drawing, particularly to the assembly shown in Figure 1, it will be seen that 5 indicates generally the conventional glass vial; while 6 indicates the glass stem; 7 the rubber or elastic connecting tube, 8 the needle that is connected through the medium of the tube 7 with the stem 6, and 9 the glass or transparent cover which fits over and houses the needle 8, connecting tube 7, and stem 6.

A salient feature of the present invention is the rubber or elastic stopper indicated generally by the reference numeral 10.

In the form of the invention shown in Figures 1 and 2, the stopper 10 is formed of rubber and comprises a substantially cylindrical body one end of which fits snugly in the vial 5 as shown. The body of the stopper 10 also is provided with an outstanding flange or collar 11 that abuts the adjacent end of the vial 5. The body of the stopper 10 is provided with an axial bore 12 and at its inner end a counter bore 13 to accommodate an end portion of the glass stem 6 as shown.

Also, and forming a very essential feature of the present invention is the provision of the integral socket or cup 14 formed on the stopper 10 at the outer end of the latter and which is of a diameter materially greater than the diameter of the stem 6. Thus the cup or socket 14, as shown in Figure 1 is adapted to snugly receive therein the open end of the transparent or glass cover 6.

In assembling the elements just described, the stem 6 is inserted in the bore 12 of the stopper 10 and the stopper 10 then placed in the open end of the vial 5. The stem 6 is then connected with a vacuum pump and the vial 5 then evacuated after which the outer end of the stem 6 is sealed as at 6a by heat or in any other suitable manner. The connecting tube 7 next has its open end sleeve on the projecting or sealed end of the stem 6 after which the base end of the needle 8 is inserted into the connecting tube 7 at the thickened closed end of said tube. Finally the glass or transparent cover 9 is positioned over the needle assembly with the open end of the cover 9 fitting snugly within the cup or socket 14, the cover 9 being evacuated and the socket or cup 14 forms a seal for the evacuated cover 9. The entire assembly is, finally, sterilized in live steam or as otherwise found desirable.

Now when using the sterilized assembly the vacuum is first released by inserting a pointed instrument into the socket or cup 14 along the side of the cover 9. The cover 9 may then be removed by drawing it from the cup or socket 14 and thereby expose the needle 8. The operator then inserts the needle 8 into the patient's vein and the sealed end of the stem 6 being broken in any suitable manner, suction created by the vacuum in the vial 5 will serve to draw the blood from the body through the needle 8, connecting tube 7, and stem 6, into the vial to be later analyzed.

Thus it will be seen that in accordance with the present invention provision is made for evacuating and sealing the glass cover 9 and thus permitting the entire assembly to be sterilized by heat to the end that such assembly will retain its sterile condition instead of becoming unsanitary as generally results from bacteria entering under the cover 9 through the usual cotton packing which is employed at the joint between the cover 9 and the stopper. However the cup 14 eliminates the use of such packing and thus serves to maintain the cover 9 sealed against the entrance thereinto of any bacteria or foreign matter.

It also will be apparent that with this invention the seal between the cover 9 and the vial 5 or stopper for the vial can be easily broken and without danger to the fingers of the operator, it being known that where the sealed glass cover is employed there is much danger of the operator's fingers being cut or scratched on sharp glass resulting from the breaking of the seal.

The assembly shown in Figure 3 illustrates the application of the invention to the vacuum Keidel type of tube. In this connection then it will be noted that the stopper therein indicated by the reference numeral 10a is designed to accommodate the Keidel tube 5a, and to that end consists of a relatively short body provided with an opening 15 therethrough to accommodate the stem 6a that is integral with the tube 5a. Also the body of the stopper 10a is provided with a concave recess 16 to fit on the end of the tube 5 where said end joins with its integral stem 6a.

The stopper 10a is also provided at its outer end with the cup or socket 14a to accommodate the open end of the cover member 9a and for sealing said end of the cover upon completion of the assembly of the elements. It is therefore believed that a further description of this assembly is unnecessary, the operation being substantially the same in connection with this assembly as that described in connection with the assembly shown in Figure 1.

From the above it will also be apparent that the invention will have the same advantages when applied either to the ordinary vial type of blood test tube, or the Keidel type of blood test tube.

Having thus described the invention what is claimed as new is:

1. In a blood testing tube assembly embodying a testing tube to be evacuated, a sealable stem for said tube, a needle, an elastic tube connecting the needle with said sealable tube, and a transparent cover for said needle, connecting tube and sealable tube; a stopper for said vial provided with an axial opening accommodating said sealable tube, and said stopper being provided with means for sealing said cover when the aforementioned elements are completely assembled.

2. In a blood testing tube assembly embodying a testing tube to be evacuated, a sealable stem for said tube, a needle, an elastic tube connecting the needle with said sealable tube, and a transparent cover for said needle, connecting tube and sealable tube; a stopper for said vial provided with an axial opening accommodating said sealable tube, said stopper being provided with a socket receiving and substantially sealing the open end of said cover.

3. In a blood testing tube assembly embodying a testing tube to be evacuated, a sealable stem for said tube, a needle, an elastic tube connecting the needle with said sealable tube, and a transparent cover for said needle, connecting tube and sealable tube; a stopper for said vial provided with an axial opening accommodating said sealable tube, said stopper being provided with a socket receiving and substantially sealing the open end of said cover, said stopper and associated socket being of elastic material.

VIRGINIA H. GRIER.